United States Patent [19]

Giori

[11] 4,054,685

[45] Oct. 18, 1977

[54] METHOD AND APPARATUS FOR MAKING WIPING CYLINDER OF STEEL ENGRAVING PRINTING PRESS

[75] Inventor: Gualtiero Giori, Lausanne, Switzerland

[73] Assignee: De la Rue Giori S.A., Switzerland

[21] Appl. No.: 573,971

[22] Filed: May 2, 1975

Related U.S. Application Data

[60] Continuation-in-part of Ser. No. 409,265, Oct. 24, 1973, Pat. No. 3,900,595, which is a division of Ser. No. 175,924, Aug. 26, 1971, Pat. No. 3,785,286, which is a continuation-in-part of Ser. No. 833,672, June 16, 1969, abandoned, and Ser. No. 462,355, June 8, 1965, abandoned.

[30] Foreign Application Priority Data

June 18, 1964 Italy .................................. 48397/64

[51] Int. Cl.[2] .......................... B32B 31/22; B41F 9/08

[52] U.S. Cl. ........................................ 427/55; 29/130; 29/132; 101/155; 101/348; 101/425; 427/293; 427/346; 427/358; 428/909

[58] Field of Search ............... 29/130, 132, ; 101/167, 101/155, 169, 348, 425; 118/232, 413, DIG. 15, 409, 641, 642, 643; 156/153, 154, 333; 427/55, 293, 346, 358; 428/909

[56] References Cited

U.S. PATENT DOCUMENTS

| | | | |
|---|---|---|---|
| 485,919 | 11/1892 | Elmore | 427/55 |
| 1,141,320 | 6/1915 | Crump | 101/169.1 |
| 2,133,517 | 10/1938 | Huebner | 427/358 |
| 2,313,830 | 3/1943 | Lundbye | 118/261 |
| 2,328,183 | 8/1943 | Barrett | 118/413 |
| 2,368,172 | 1/1945 | Taber | 118/409 |
| 3,304,909 | 2/1967 | Hart et al. | 118/409 X |
| 3,369,922 | 2/1968 | Svrchek | 427/425 X |
| 3,697,302 | 10/1972 | Ihara et al. | 118/409 X |
| 3,767,457 | 10/1973 | Hubbard et al. | 427/54 X |

*Primary Examiner*—Michael R. Lusignan
*Attorney, Agent, or Firm*—Robert E. Burns; Emmanuel J. Lobato; Bruce L. Adams

[57] ABSTRACT

A wiping cylinder is coated with a synthetic resin plastic composition by rotating the cylinder downwardly past a straight-edge blade on which the plastic composition is supplied so that a thin uniform layer is spread onto the cylinder. The blade is progressively retracted from the cylinder so that successive layers are applied to provide the desired total thickness. Provision is made for first heating and then cooling a layer after it has been applied.

13 Claims, 8 Drawing Figures

METHOD AND APPARATUS FOR MAKING WIPING CYLINDER OF STEEL ENGRAVING PRINTING PRESS

This application is a continuation-in-part of application Ser. No.: 409,265, filed Oct. 24, 1973, now U.S. Pat. No. 3,900,595, which is a division of application Ser. No. 175,224 filed Aug. 26, 1971 now U.S. Pat. No.: 3,785,286 which was in turn a continuation-in-part of application Ser. Nos.: 833,672 filed June 16, 1969 and 462,355 filed June 8, 1965 both now abandoned.

The invention relates to a method of making a wiping cylinder for steel engraving printing machines and to a method of renewing the surface layer of such wiping cylinder.

With steel engraving printing it is known to use at least one wiping cylinder as a wiping device for the engraved printing plate or the engraved cylinder, which has the task of pressing into the engraving grooves of the printing plate or the engraved cylinder the color or colors applied on the printing plate or the engraved cylinder by the single-color rollers and to clean the color from the plenum i.e. the non-printing surface outside the engraving grooves.

To obtain good quality printing, use is preferably made of two wiping cylinders contacting the printing plate in sequence, of which the first cylinder has the function of pressing the colors into the engraving grooves and of removing already a substantial part of the color to be found on the plenum, whereas the second wiping cylinder has the function of cleaning the plenum completely free from color.

In all cases, the surface of the wiping cylinder must comply with quite definite requirements if satisfactory wiping is to be obtained. Furthermore, the surface layer of the wiping cylinder must be adapted to be capable of being cleaned continuously of colors adhering thereto, so that the wiping cylinder surface coming each time afresh in contact with the printing plate is completely free from color. For this purpose it is known to clean the wiping cylinder surface continuously with a preferably organic solvent. As a cleaning bath, trichlorethylene or a similar organic compound has heretofore been used practically exclusively.

As trichlorethylene is comparatively costly and, for economical use, requires a recovery plant, it has already been proposed to use as a solvent a considerably less expensive solution, for example petroleum.

Even more advantageous and still cheaper, it has already furthermore been proposed to use simply water, to which detergents and tension relieving means usual in the trade have been added.

As the dissolving capacity of all other solvents for the colors used in steel engraving printing is not so great as that of trichlorethylene, it has also already been proposed to free the wiping cylinder surface mechanically of the greater part of the adherent color before contact with the petroleum bath by means of a scraping blade. This also provides at the same time the advantage that the greater part of the generally speaking valuable printing color can be recovered.

With the use of petroleum or simple aqueous cleaning fluids, it is, generally speaking, necessary to use a scraper device to free the wiping cylinder surface of the liquid film ahering thereto as it comes out of the cleaning bath.

Up to the present, a gelative layer has commonly been used as the surface layer for the wiping cylinder. The gelatine layer is stuck on the jacket of the wiping cylinder by means of a cloth base. Such known gelatine layer, has, however, a number of disadvantages:

1. The gelatine layer has only a very restricted length of life. From experience it can only be used for approximately 60,000 printings, which with modern printing machine corresponds to a duration of two days, whereupon the gelatine layer must be renewed, and this process is comparatively costly.

2. The gelatine layer is extraordinarily sensitive and can be scratched, for example by sharp engraving edges or small particles of dirt, whereby the said layer immediately becomes unusable and must be replaced in its entirety.

3. The gelatine layer is also very sensitive to outside influences, such as variations in temperature and the moisture content of the air. Accordingly, it is necessary that a wiping cylinder coated with a gelatine layer should not be left in the machine overnight or during long interruptions in the work, but has to be stored in a heated cupboard or where there is air conditioning. This always means dismantling, and at the beginning of the work, the reinstallation of the wiping cylinder. If this were not done, the gelatine mass, under the effect of variations in the temperature, would "work" which easily brings the risk of the formation of cracks.

4. As the gelatine layer is put on a cloth base which itself must be glued to the wiping cylinder jacket, the said layer necessarily has an overlapping joining part, which is very disadvantageous on two counts; in the first place the said overlapping place must naturally never come into contact with the printing plate or the engraved cylinder to be wiped, so that care must be taken to see that the wiping cylinder always turns in phase with the printing plates or the engraved cylinders, and this means that it is always exactly the same sections of the gelatine layer which carry out the actual wiping function and come into contact with the printing plates. Accordingly, it is always exactly the same portions of the gelatine layer that are subjected to strain and are used up, with resultant rapid wear and tear of the wiping cylinder surface.

Furthermore, the seam of the gelatine layer makes it impossible for the scraping blade to glide smoothly over the wiping cylinder surface so as to remove the adhering color in the main part from the wiping cylinder surface or, after treatment in the cleaning bath, to free it from the adhering liquid film. Still less, because of the said overlapping place, is a rubbing clean of the wiping cylinder surface possible by means of a strip wiping device i.e. without the use of solvents.

For the cleaning of wiping cylinders equipped with a gelatine layer, one is accordingly still forced to use a highly effective organic solvent i.e. trichlorethylene.

5. If the surface of the gelatine layer is once made unusable by wear or by the occurring of the scratches, then it is necessary to remove the whole layer together with its cloth base from the cylinder jacket, and to replace it in its entirety with a new layer. It is not possible to renew the damaged cover layer of the gelatine mass.

The aim of the invention is to overcome the above mentioned disadvantages previously known with wiping cylinder layers. The method proposed for this purpose for the production of the surface of the wiping cylinder in single color or multicolor steel engraving printing machines, has the feature that a cylinder coated with a rubber layer is covered with a first layer of a synthetic plastic which is flowable in the state of use and has good strengthening properties; this plastic layer is evenly distributed by means of at least one blade adjustable as described hereinafter disposed parallel to the axis of the cylinder and moveable relative to this; finally this first inner layer is allowed to harden at least partially, and then with repetition of the operations described, a determined number of further plastic layers are applied in sequence to the cylinder surface until the total layer thickness reaches a prearranged value and in the hardened out state, the covering layer gives the surface of the cylinder suppleness and good gliding properties. To prevent shrinking effects during the hardening of the layer which can result in cracks or unevenness, the thickness of each layer is chosen sufficiently small, in general less than 1 mm.

When the wiping cylinder is to be cleaned during the printing process with an organic solvent, for example trichlorethylene, a particularly suitable synthetic resin for the process in accordance with the invention is a synthetic resin that is soluble in water, but which in organic solvents dissolves with difficulty if at all, viz a polyvinyl alcohol that is partially saponified and contains acetyl groups. A thermoplastic synthetic resin of this type is known under the registered Trade Mark "Mowiol" and is produced by the Farbwerke Hoechst A.G. Germany. If the wiping cylinder is to be cleaned with an aqueous solution, a synthetic resin nonsoluble in water such as a polyvinyl chloride is recommended, for example, that known under the Trade name "Solvic" 340 (produced by Solvay Cie, Brussels, Belgium), or under the Trade name "Hostalit P/VP 3475" (produced by Farbwerke Hoeschst A.G. Germany).

The product known under the registered Trade Mark "Mowiol" designates a group of polyvinyl alcohols of various degrees of polymerization and hydrolysis, which with water form highly viscous solutions with good protective colloidal effect. The aqueous solution dries to a clear comparatively solid film and was previously used preferably in the adhesive, paper and textile industries as layers for nylon yarn, as a gel agent for the production of cosmetics and the like.

The plastic layer of the invention overcomes all the disadvantages mentioned under points 1 to 5 found with the previously known gelatine-covered wiping cylinder. The holding power of such plastic layer is effective for at least 3 to 6 months on a basis of approximately 30,000 printings per day. It is practically resistent to all external influences, in particular to variations in temperature and variations in the moisture content of the air. The wiping cylinder accordingly does not need to be stored in a cupboard with air circulation during intervals in the work, but can remain positioned ready for use in the printing machine. The plastic layer has no seam or joining place, but a completely smooth surface, so that work can be done with a continual "phase displacement" of the parts of the layer coming in contact with the printing plate. This means that all regions of the wiping cylinder layer are brought to an equal extent into the equal wiping function, and accordingly are evenly stressed. It is possible therefore to take care, for example, that the region of the wiping cylinder surface coming in contact with the pressure plate on each turn is displaced each time through an angle of 6°, so that it is only after 60 printings that the original wiping cylinder place then comes in contact with the pressure plate.

Furthermore, with the seamless synthetic layer, scraping blades can be used for mechanically stripping off the color and/or the liquid film from the wiping cylinder surface. Similarly, the wiping cylinder surface can be rubbed clean with a strip wiping device.

The synthetic layer is also substantially less sensitive to the formation of cracks than is a layer of gelatine.

A further important advantage consists in that after the wear and tear of the cover layer of the plastic mass, one is not forced to renew the whole wiping cylinder layer, but it is sufficient simply to remove the damaged cover layer mechanically, and here, in the case of a water-soluble plastic, which dissolves with difficulty if at all in organic solvents, the cover layer can be softened or dissolved previously in water before being mechanically removed, whereupon by putting on a new plastic cover layer, the original diameter of the wiping cylinder surface is again produced. The long life of the plastic layer of the invention as well as the possibility of simple renewal of only the cover layer, represent an extraordinary saving in expense in comparison with the previously known wiping cylinder layers.

It has furthermore been seen that the quality of the printing produced with the wiping cylinder is improved with the use of a plastic layer.

The invention will now be described in greater detail with reference to the accompanying drawings in which.

Figure 1:
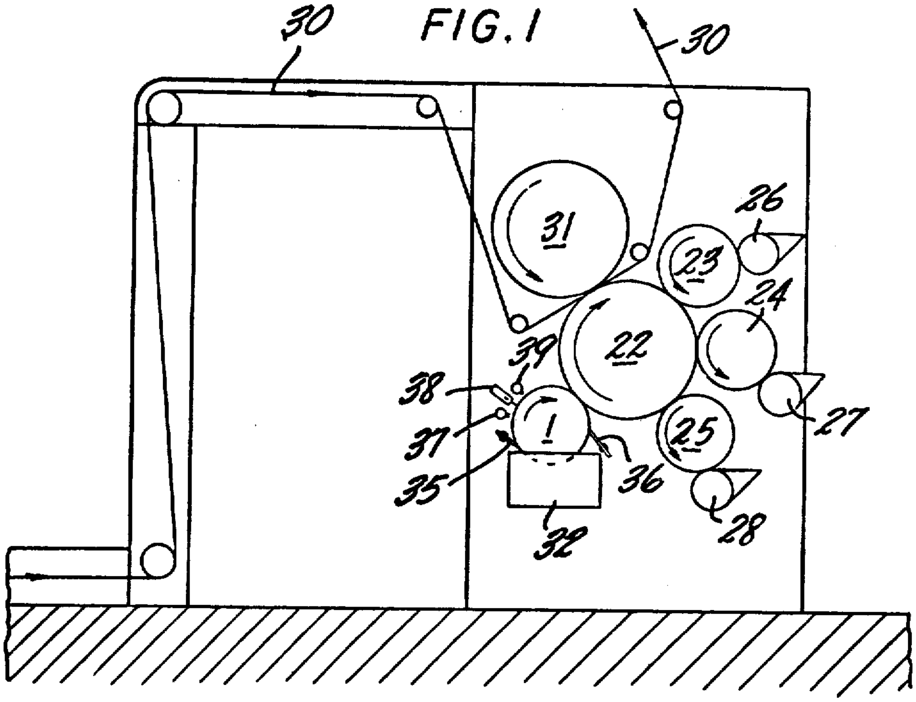
FIG. 1 is a schematic view of a steel engraving printing machine having a wiping cylinder made in accordance with the method of the present invention.

In FIG. 1, there is shown schematically a steel engraving printing machine having a wiping cylinder 1 made in accordance with the method of the present invention. The wiping cylinder 1 is mounted in position to engage a plate on the plate cylinder 22 to which ink is supplied by one or more inking rollers 23, 24 and 25 with their associated inking device 26, 27 and 28 respectively. A paper web 30 to be printed passes between the plate cylinder 22 and an impression cylinder 31. The directions of rotations of the respective cylinders and rollers and the direction of travel of the paper web are indicated by arrows. It will be seen that the inking rollers 23, 24 and 25 turn in the opposite direction from the plate cylinder 22 and hence have a rolling engagement with a plate on the plate cylinder while the wiping cylinder 1 turns in the same direction as the plate cylinder and hence has a wiping engagement with the plate. After ink has been applied to a plate on the plate cylinder by the inking rollers 23, 24 and 25, the plate is wiped by the wiping cylinder 1 to press the ink into the engraved grooves and remove it from the plenum of the plate before it reaches the impression cylinder 31.

Figure 2:
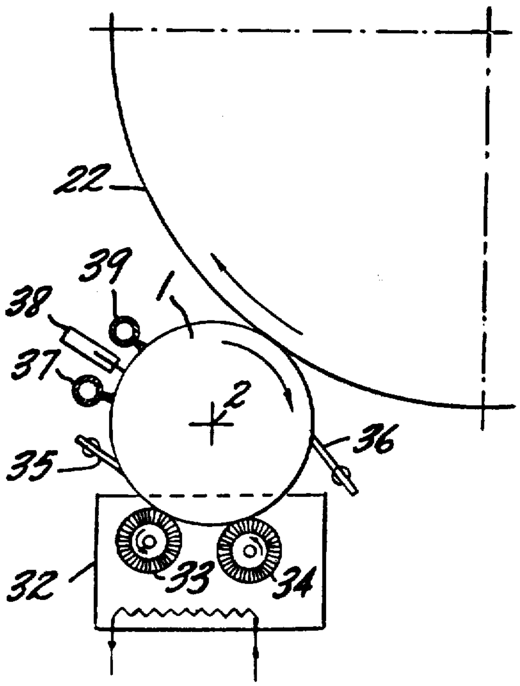
FIG. 2 is a schematic view on a larger scale of the wiping cylinder and associated parts.

The wiping cylinder 1 is kept clean by a cleaning bath in a container 32 as shown in FIGS. 1 and 2. Rotating brushes 33 and 34 are shown in the bath. A doctor blade 35 removes the cleaning fluid from the wiping cylinder. In case it is desired to reclaim a portion of the ink or to reduce the contamination of the cleaning bath, a doctor blade 36 is provided in position to engage the surface of the wiping cylinder before it enters the bath. When an aqueous solution is used for the cleaning bath, a water spray 37, squeegee 38 and air drying pipe 39 are provided following the doctor blade 35. When trichloroethylene is used as the cleaning bath, the elements 37, 38 and 39 are not needed.

Figure 3:
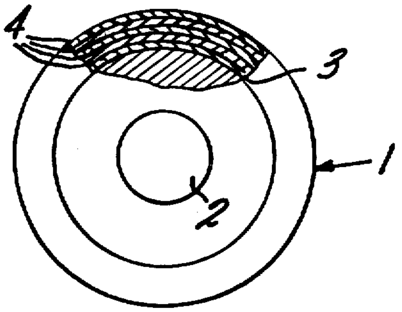
FIG. 3 is a schematic end view, partially in cross section, of a wiping cylinder, the thickness of the layers being exaggerated for clarity.

As shown schematically in FIG. 3, the wiping cylinder 1 has a shaft or axle 2. The periphery of the cylinder body is covered with a base layer 3 of rubber on which a plurality of plastic layers 4 have been successively applied.

Figure 4:
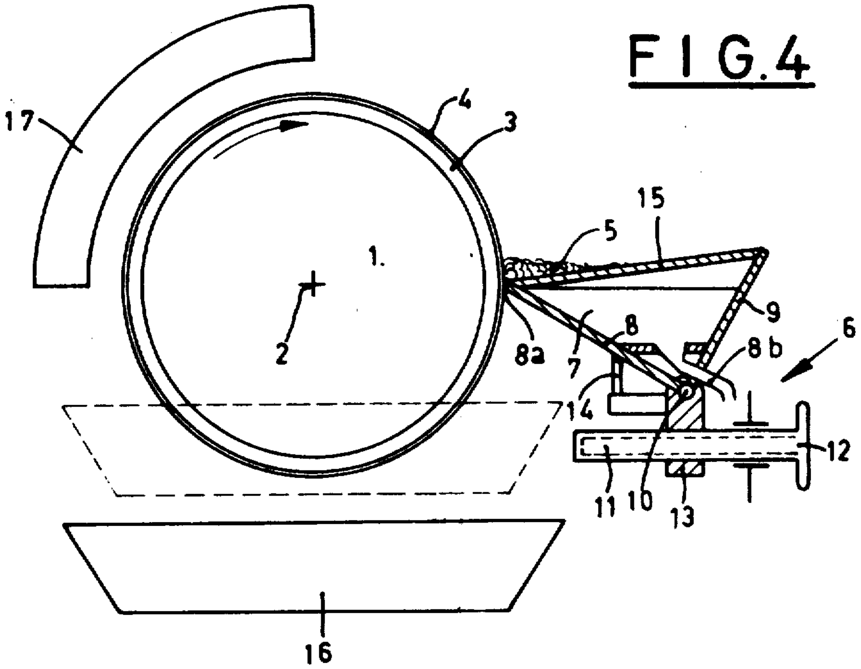
FIG. 4 is a diagrammatic view of a device for applying a surface layer to a wiping cylinder.

A device 6 for applying the successive layers is shown schematically in FIG. 4. This device can also be used for replacing the worn cover layer as illustrated schematically in FIG. 5. In applying the successive plastic layers to the wiping cylinder 1, the cylinder is mounted for rotation about its axle or shaft 2. During the process the cylinder is put into rotation by suitable means which are not shown in the drawings, the direction of rotation being indicated by an arrow. As the cylinder is rotated, a layer of plastic is progressively applied by the device 6.

As shown in FIG. 4 the device 6 comprises an elongated container 7 which extends lengthwise of the cylinder to be treated. The container 7 comprises an inclined base 8, an inclined rear wall 9, opposite end walls 7a and a removable cover plate 15. On the edge of the base 8 toward the wiping cylinder, there is provided a scraper blade 8a which extends parallel to the cylinder axis over the entire length of the jacket of the cylinder. It is naturally also possible for the scraper blade 8a to form part of the base plate 8 itself. The scraper blade 8a is disposed at a small angle of inclination to a plane defined by the edge of the scraper blade and the axis of the cylinder when the container is in operative position as shown in FIG. 4.

The container 7 is tiltably mounted by means of a shaft 10 on a support 13. An abutment 14 on the support 13 is engageable by the base 8 of the container to position the container relative to the support. The support 13 and the container 7 carried by it are movable toward and away from the wiping cylinder 1 by means of a threaded shaft 11 which is rotatable in the mechanism framework which is not shown in detail and is rotatable by means of a handle 12. The threaded shaft 11 and associated parts comprise in effect a micrometer device which makes possible accurate and readable adjustment of the support 13 and hence the container 7 in relation to the jacket of the cylinder 1.

In FIG. 4 the device is shown diagrammatically in position for applying a layer of plastic to the cylinder. The cylinder is represented as being coated with a base layer of rubber 3 on which there has also been applied one or more plastic layers 4. The plastic mass 5 of which a layer is to be applied to the cylinder is distributed on top of the cover 15 which as shown is disposed somewhat at an angle so that the plastic mass engages the surface of the cylinder.

When the cylinder 1 turns in the direction of the arrow, a fresh layer of the plastic mass 5 is applied to the cylinder through the small gap between the scraping edge of the blade 8a and the layer of plastic 4 which had already been applied to and has solidified on the cylinder. The plastic mass is distributed evenly by the blade edge 8a and the thickness of the layer being applied is accurately controlled by adjusting the blade 8a toward or away from the cylinder by means of the threaded shaft 11. Accordingly a further layer of plastic is applied with a completely smooth surface and an exactly defined thickness. When the first layer has been completely applied to the cylinder jacket, the cover 15 is removed so that the blade 8a can smooth out any remaining uneven spots without supplying fresh plastic mass.

Finally the blade 8a is removed from the cylinder by tilting the whole container 7 upwardly and rearwardly about the shaft 10. A heating and drying device 17 disposed in the peripheral region of the cylinder 1, which can work with radiation and/or hot air, speeds up the drying and hardening of the freshly applied plastic layer.

When the drying and hardening is completed, the next synthetic layer is applied in the same way as described.

Figure 5:
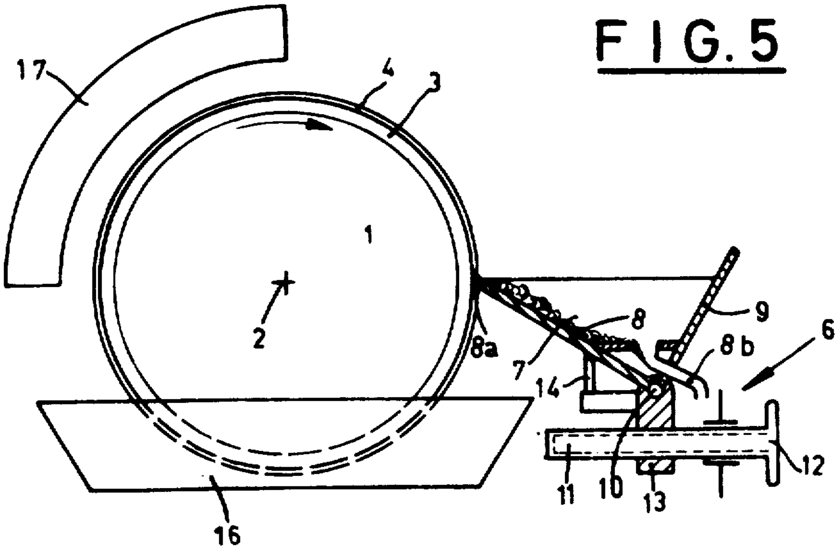
FIG. 5 is a similar diagrammatic view illustrating the scraping off of the used cover layer of the wiping cylinder using a water soluble synthetic resin.

There is further shown in FIG. 4 a water bath 16 which can be put in a perpendicularly raised position as can be seen in FIG. 5, and in which the cylinder is partially immersed in the water. This water bath is used for the more rapid cooling of a layer that has been applied. In the case of water soluble synthetic resin, the water bath is used only when renewing the cover layer.

In FIG. 5 there is shown diagrammatically the position of the device in which the worn cover layer 4 of a water soluble synthetic mass is softened or already partially dissolved in the water bath 16 through which the cylinder 1 turns in the direction of the arrow. The softened cover layer is then lifted off or scraped off by the same blade 8a, which is moved successively towards the cylinder by means of the micrometer device 11, 12, 13. The plastic mass removed by the blade 8a collects in the container on the base 8 and is taken away via a discharge opening 8b optionally for further use.

EXAMPLE 1

There is described below a detailed example for the preparation of the plastic mass used and also for the advantageous applying of the first plastic layer onto the cylinder jacket in the case of the use of a plastic which is not soluble in water.

Use is made here for example of polyvinyl chloride known under the Trade name of "Hostalit P/PV 3475". Two differing initial masses A and B are produced, the first of which, A, is used at least for the formation of the first base layer and has particularly good strength whilst the other, B, is used at least for the formation of the outer cover layer which when hardened gives suppleness to the surface of the wiping cylinder and has good gliding and wear properties.

The plastic mass A is composed of 100 parts by weight of polyvinyl chloride PVC, 30 to 50 parts by weight, preferably 40 parts by weight of dioctyl-phthalate (DOP), 30 to 50 parts by weight, preferably 40 parts by weight, of tricresylphosphate (TCP) and 0.5 to 3 parts by weight, preferably 1 part by weight, of a stabilizier known in the trade. DOP and TCP are used as softeners.

The plastic mass B is composed of 100 parts by weight of PVC, 25 to 40 parts by weight, preferably 33 parts by weight of DOP, 15 to 30 parts by weight, preferably 22 parts by weight, of TCP, 3 to 10 parts by weight, preferably 5 parts by weight of calcium carbonate, 2 to 5 parts by weight, preferably 3 parts by weight, of graphite as a lubricant, and 0.5 to 3 parts by weight, preferably 1 part by weight, of a stabilizer known in the trade.

The calcium carbonate contributes to increasing the wiping effect of the wiping cylinder surface on the base plate to be wiped, and the finely distributed graphite helps to improve the smooth gliding.

USE OF THE PLASTIC MASS A

For applying the first plastic base layer onto the wiping cylinder provided with a rubber jacket, the said rubber surface is roughened so that the plastic can have a good hold on the rubber surface. A rubber base layer with Shore hardness A amounting to between 40 and 90, and preferably between 70–75, is particularly suitable for the applying of the plastic layer. While the thickness of the rubber base layer can be varied, it is desirably between 0.3 mm and 4.0 mm and preferably about 1 mm. Then the wiping cylinder jacket is covered over its whole extent with a gauze strip, this being done preferably by arranging that the wiping cylinder to be treated is pressed against a passing cylinder, and with locking of the pressing cylinder, to prevent its rotation, the cylinder to be treated is rotated, the gauze strip being inserted between the cylinders. In this way the gauze strip is wound around the cylinder to be treated smoothly, without folds or puckers. At the same time between the two cylinders, a suitable amount of the plastic solution A is poured, so that the gauze strip is completely saturated with this solution. The plastic mass here serves as adhesive by which the gauze strip is fixed onto the rubber surface. After the stripping off of the superfluous plastic mass by means of a blade such as blade 8*a*, FIG. 4 which produces an evenly distributed layer having a thickness of 0.3 to 1 mm, preferably of 0.8 mm and after the hardening of the plastic, there is formed a thin, even base film, in which the gauze strip is embedded.

The plastic mass when it is applied has a temperature between 20° C and 60° C, which is selected in such a way that viscosity during use is kept as low as possible. After the applying of the first base layer, the hardening out takes place at a temperature between 200° C and 250° C for at least 5 minutes, in order to obtain a good adhesion of the plastic mass, gauze strip and rubber jacket.

When preferably a mixture of nitrile and vinyl polymers is used for the rubber jacket having a Shore hardness A 70–75, no gauze strip is necessary, because such a rubber jacket produces an excellent adhesion between the rubber surface and the first PVC layer.

When a sufficient hardening of the layer is obtained, there is a delay in the putting on of the next plastic layer until the layer cylinder surface has again cooled off to a temperature between 20° C and 60° C. For speeding up this cooling, the wiping cylinder can be immersed at least partially in a cooling water bath by raising the pan 16 as is shown diagrammatically in dotted lines in FIG. 4.

The strength of the hardened plastic layer produced from the mass A can be, for example, of Shore hardness A 60 to A 70 and preferably about A 65.

For the further plastic layers forming the midlayers, one can use optionally either the plastic mass A or B, the only thing that is important being that the plastic mass B is used at least as the last outer cover layer. The mass A can be used accordingly for the production of the further plastic layers.

After the initial treatment described, the cylinder is provided with a firmly adhering base layer and can be covered with further plastic layers, successively, preferably with the device shown in FIG. 4, the thickness of which at all times preferably lies between 0.3 and 1 mm. Each of the said layers is put on at a temperature between 20° C and 60° C and then is hardened by heating to a temperature between 150° C and 250° C, preferably to approximately to 200° C. When the hardening process is completed, the layer is again cooled to 20° C to 60° C, and here for speeding up the cooling, the water bath 16 can be used. The process cycle is repeated until the whole thickness of the layer has reached a value which differs only by at least one layer thickness from the desired total thickness, which in all can amount to 2 to 3.5 mm. For instance, four layers of plastic mass A each having a thickness of 0.8 mm are applied amounting to a total thickness of 3.2 mm. It has been found that the thickness of the individual layers and the total thickness of the layers is critical to obtain a smooth, crack-free and durable cover for the wiping cylinder.

USE OF THE PLASTIC MASS B

For the outer cover layer or layers, as already mentioned, the plastic mass B is used. The application of the outer cover layer differs from the treatment of the inner layers, in that for the hardening of this outermost layer, preferably an increased temperature in the range of 200° C to 250° C is used e.g. 200° C, in order to obtain good hardness of the said layer, which is subjected to stress during the subsequent wiping process in the printing process. All other layers are heated to approximately 200° C. Whilst the strength of the hardened inner, layers produced from the mass A, as indicated, would correspond to approximately Shorehardness A 65, for the strength of the cover layer produced from the mass B one preferably selects a strength which corresponds to Shore hardness A 80 to A 95 and preferably A 90. The thickness of the outer layer or layers of the plastic mass B is likewise between 0.3 and 1 mm. If a single layer of plastic mass B having a thickness of 0.8 mm is applied over four layers of plastic mass A each having a thickness of 0.8 mm, the total thickness is 4 mm.

If after a certain amount of use of the wiping cylinder in the printing process the cover layer shows a certain amount of wear and tear, this cover layer can be renewed by removing it initially mechanically for example by means of a lathe tool on a lathe, down to a depth at which all cracks, damaged areas and uneven places are done away with. Thereupon the said cover layer, which has been removed mechanically in this way is replaced by a new plastic layer of the mass B, which is then brought to a temperature between 20° C and 60° C and then is hardened at a temperature between 200° C and 250° C.

The point of time of the completed hardening out can easily be recognized with the use of Solvic PVC, as the plastic layer takes on a transparent appearance.

EXAMPLE 2

As second example will be described the production of plastic masses from a water soluble resin, and also the applying of this plastic mass. For this purpose use is made of three polyvinyl alcohol types which are customary in the trade, i.e. Mowiol 30 to 88, Mowiol 50 to 88 and Mowiol 70 to 88, which are partially saponified, and are polyvinyl alcohols containing acetyl groups. The first figure in the type designation characterises the length of the molecule chain and accordingly the relative polymerization degree of the polyvinyl acetate used; the second figure of the type designation indicates the degree of saponification.

To produce the solution A for the base layer; one mixes 150g Mowiol 30 to 88, 150g Mowiol 50 to 88 and 900g Mowiol 70to 88.

To this power mixture is added approximately 300g ethyl alcohol. For this, use is made for example of "Halethyl PCB" 1002, which is a compound of 20 parts by weight of ethyl alcohol, 30 parts by weight of methylethyl-ketone and 50 parts by weight of ether. The resulting swelling paste is ground fine to a thoroughly homogenous mass, to which is then added approximately 510 parts by weight of hot water which is near its boiling point. Still maintaining the temperature, the resulting solution is thoroughly homogenized. The said hommogenous solution then has added to it approximately 30 parts by weight of glycerine of pharmaceutical quality.

The thus prepared solution is filtered, and the resulting filtrate changes after the cooling into a mass which remain viscous and which is ready for applying. At room temperature the useful life of this mass is 3 to 5 days till it is dried and hardened to the extend that it requires a further treatment for reuse.

Production of the solution B for the cover layer; approximately 1.5 liters of the above described solution A is heated in a water bath to approximately 80° C. This heated solution has added to it approximately 50 ml of chalk white (calcium carbonate $CaCO_3$) which previously has been suspended in a small amount of cold water to form a homogeneous paste.

After thorough mixing, the said solution has added to it approximately 10 ml of tannic acid which was previously dissolved in a small amount of hot water. After cooling, the solution B produced in this way is ready for applying.

Additionally or in place of the chalk white mentioned, the solution A — as in the case of the PVC — can also have added to it an equal amount of graphite which was previously suspended in a small amount of alcohol, with the formation of a homogeneous paste.

APPLYING THE PLASTIC MASSES A and B

The applying of the first plastic base layer using a gauze strip, onto the roughened rubber jacket of the cylinder corresponds to the process step described for PVC. The mass, however, in this case is applied at room temperature, whilst the subsequent hardening out needs to take place only at moderate temperatures. The hardening is carried out to provide a Shore hardness of A 60 to A 70 and preferably about A 65.

The separate layer thicknesses are only 0.1 to 0.3 mm and the total thickness is selected at 1 to 2 mm. If one wishes to obtain a total layer thickness of 2 mm and one assumes that the said base layer has a thickness of 0.2 mm, then by means of the device of FIG. 4 for example 8 layers are applied in sequence of 0.15 mm each, using the plastic solution A. Before the applying of the subsequent layer, the last layer must always be well dried and hardened.

For producing the cover layer areas, one uses the above mentioned soltuon B in place of the solution A. In the case considered, four further plastic layers each 0.15 mm thick of the plastic mass B are applied and each layer is dried and hardened before applying a succeeding layer. The cover layers should have a hardness greater than the under layer or layers, for example a Shore hardness between A 80 and A 95 and preferably about A 90.

Naturally the thickness of the cover layer which is produced from the plastic mass B can be varied at will; all that is needed is simply that the number of the layers produced from solution A and from solution B must form the total combination required.

In the dimensioning of the thickness of the separate plastic layers or of the dimensioning of the total thickness, in the case of Mowiol, one has to take into account the shrinking effect of the plastic mass. The shrinking is also the reason why one applies one at a time only comparatively thin layers. If one were to apply too great layer thicknesses all at once there would be the danger that during the hardening the layer would show uneveness or even cracks, as a result of the shrinking For the renewing of a used cover layer all that has to be done is to immerse the cylinder in a water bath and to soften or dissolve the cover layer with simultaneous stripping off or scratching off by means of the blade 8*a*, as in FIG. 5. When the drying is completed, one or more fresh surface layers are put on, described, using the solution B.

EXAMPLE 3 the plastic material utilized is a polyvinyl chloride which lends itself particularly well to the formation of mixtures with plasticizers. These mixtures are commonly called "Plastisol".

the Plastisol is a liquid characterized by a certain viscosity which is greater when the content of the plasticizers is smaller. When the Plastisol is heated, the viscosity at first decreases (at a temperature of 40°-50° C.) then at about 60° there is a very rapid increase of the viscosity and the mass becomes solid, attaining a stage called "pre-gelatinization". The compact mass thus obtained is friable and has a very low mechanical strength. When the heating is continued to about 180°-200° C. there is abtained a complete "gelatinization" and after cooling it results in a material resembling rubber which is insensible to water, aqueous solutions, acids and alkalies, alcohol and hydrocarbons. This material is characterized by a very high mechanical strength and the Shore hardness of the final product is a function of the type and the quantity of the plasticizer used. For covering wiping cylinders for use with water, there is used a Plastisol, the characteristics of which permit obtaining not only a good coating (for which the viscosity should not be too high) but also the desired qualities of the final product (hardness, mechanical strength, characteristics of the coating, etc.).

The products used to obtain this effect are as follows:

1. Polyvinyl Chloride (PVC):

"Hostalite P/VP-3475" made by Hoechst AG Frankfort, West Germany. This is a white powder obtained by the polymerization in emulsion of vinyl chloride. The form and size of the molecules are such as to provide very fluid Plastisol. While the powder is not hygrascopic, it is advisable to store it in closed vessels.

2. Trioctyle-phosphate (TOP):

This plasticizer is manufactured by the Bayer Company.

3. Dioctyle-sebacate (DOS):

This plasticizer is supplied by the Swiss Company Oel-Chemie.

4. Plastolein 9789:

This polymeric plasticizer is supplied by the Unilever Company, Emery, Holland.

5. Stabilizer:

During the rapid heating necessary to effect gelatinization, the PVC has a tendency to degrade by producing hydrochloric acid while the color changes from white to yellow to brown and to black. This inconvenience is completely eliminated by the addition of stabilizers. A suitable stabilizer for this purpose is the tin base PROSPER-DBM supplied by the Commer Company.

6. Additives:

Calcium carbonate and graphite. These additives contribute to modifying the characteristics of the final product to improve its wiping quality and to reduce the coefficient of friction.

Preparation of the Plastisol

The different components should be perfectly disbursed in the mixture which should be absolutely free of air bubbles and moisture. For this purpose it is desirable to use a planetary mixer which working under vacuum effects the mixing, the extraction of air and the elimination of moisture. The different phases of the operation are as follows:

1. The several components are placed in the mixing vessel according to the proportions indicated below.

2. The mixer is put into operation for thirty minutes and the vacuum pump is then put into operation. At first, the mass swells and becomes frothy. The air discharge valve is eventually opened slowly while the mass is observed through a porthole to prevent the froth reaching the upper part of the vessel. After some minutes, the valve can be completely closed, whereupon the mixer is continued in operation for at least one hour.

3. The mixer is stopped while opening the air valve with caution and then the mass is filtered through a bronze screen into a second mixing vessel.

4. The blades are thoroughly cleaned and the mass is again mixed under vaccum, the vaccum pump being maintained this time in operation until bubbles of air are practically eliminated.

5. The mixer is stopped, the air valve is opened with caution and finally the vacuum pump is stopped.

The Plastisol is then ready to be applied to the cylinder. It is recommended that a freshly prepared batch be used (within 24 hours) because in time the viscosity increases and coating becomes more difficult.

Preparation of the Surface of the Rubber

It is very important for the surface of the rubber to be prepared before the application of the plastic mass in such manner as to assure a perfect bonding of the plastic on the rubber. The necessary operations are as follows:

1. The cylinder to be coated is placed on the coating machine, the heating hood is lowered and the cylinder is turned at a speed of five revolutions per minute and heated for thirty minutes (all of the central resistances being put into operation during the last twenty minutes). The heating is then discontinued and the cylinder is allowed to cool while continuing to rotate for a quarter of an hour.

2. While rotating the cylinder it is again heated for 20 minutes (using all of the resistances during the first 10 minutes and then only the central resistances during the last 10 minutes). Heating is then discontinued for 15 minutes and resumed for another 20 minutes (10 plus 10 minutes).

3. The cylinder is then cooled with water, wiped dry and the surface of the cylinder is very carefully and uniformly treated with emery paper in order to eliminate all residual oil or grease from the surface of the rubber. The entire surface as thus treated should have a black color.

4. The cylinder is carefully brushed to totally eliminate the particles rubber, is wet with water and is dried with a rubber cloth (which cannot leave any residue).

5. The cylinder is again heated for 15 minutes (10 plus 5 minutes) and then allowed to cool without turning until it reaches a temperature of about 40° C. The cylinder is then ready for application of the first coat of plastic.

Application of the Plastic

| The Plastisol has the following composition: | |
|---|---|
| "Hostalite P/VP-3475" | 1000 gr. |
| Trioctyle-phosphate (TOP) | 240 gr. |
| Dioctyle-sebacate (DOS) | 120 gr. |
| Graphite | 15 gr. |
| Calcium carbonate | 15 gr. |
| Prosper DBM | 10 gr. |

The speed of the cylinder is regulated to 5 revolutions per minute. When the cylinder is cold it is heated several minutes until the surface attains a temperature of about 40° C.

With the cylinder stopped, the blade and the counterblade are brought in toward the cylinder in such manner that they barely touch the surface of the cylinder without pressure. A small quantity of the Plastisol is then spread along the whole length of the blade above the line of contact between the blade and the cylinder. The cylinder is then put in rotation and after one complete turn the blade is slowly withdrawn so that a thin coating 0.1 - 0.2 millimeters) is applied over the entire surface of the cylinder. After removing the blade, the cylinder is allowed to rotate cold for several minutes and then the heating hood is lowered and heat is applied for 23 minutes (using all of the resistances during the first 8 minutes and then only the central resistances during the last 15 minutes). The heat is then turned off but the heating hood is left in its lower position several minutes. Then it is raised and the cylinder is cooled with water to a temperature of about 40° C. The cylinder is then wiped dry, washed with ordinary alcohol, and when the surface is perfectly dry, it is ready to receive a second coating. Additional coatings of the same composition may be applied in like manner but at least the outer coating is of a different composition as described below.

Outer Coating

| A Plastisol having the following composition is utilized: | |
|---|---|
| "Hostilite P/VP-3475" | 1500 gr. |
| Trioctyle-phosphate (TOP) | 360 gr. |
| Dioctyle-sebacate (DOS) | 180 gr. |
| Plastolein 9789 | 150 gr. |
| Graphite | 45 gr. |
| Calcium carbonate | 45 gr. |
| Prosper DBM | 15 gr. |

The procedure is the same as for the first coating while using a somewhat larger quantity (about 450 cc.). During application of the plastic, the blades are withdrawn until almost the entire amount of plastic has been applied to the cylinder - a small quantity of plastic, however, remaining on the blade. The curing, cooling with water, washing with alcohol and the drying are effected as for the first layer.

The operation of coating is repeated until the diameter of the cylinder exceeds 266 millimeters. At the beginning of each coating the cylinder should have a temperature of about 40° C. In the case where the cylinder is cold it is necessary to heat it several minutes to bring the surface to this temperature.

Rectifying and Polishing

Experience has shown that is is rarely possible to obtain a perfectly cylindrical layer of plastic by coating. To overcome this inconvenience there has been provided a machine for truing the plastic coated cylinder. After the last layer has been applied it is advisable to let the cylinder sit at leat over night before proceeding with the truing. The truing operation is carried out with the cylinder dry and comprises rotating the cylinder while removing any high portions by a cutting tool or abrasive. One or more operations are required according to the initial amplitude of the irregularities. After the cylinder has been trued, it is moistened with water and polished with an extremely fine emery paper until the surface is perfectly smooth and uniform.

Regeneration of the Coated Cylinders

When a coated cylinder is to be renewed, it is necessary first of all to turn it until all of the surface irregularities have disappeared. Then its diameter is checked. When the diameter is greater than 264 millimeters the cylinder can be polished and reused.

On the contrary if the diameter is found to be too small, it will be necessary to apply one or more layers of plastic and to true and polish the surface when the diameter has been brought anew to 265 millimeters.

In a case where after rectification small cavities appear on the surface of the plastic (indicating a decomposition of the plastic) it will be necessary to proceed with the rectification until the basic layer of rubber is reached whereupon all of the coating operations are repeated as described above.

Figure 6:
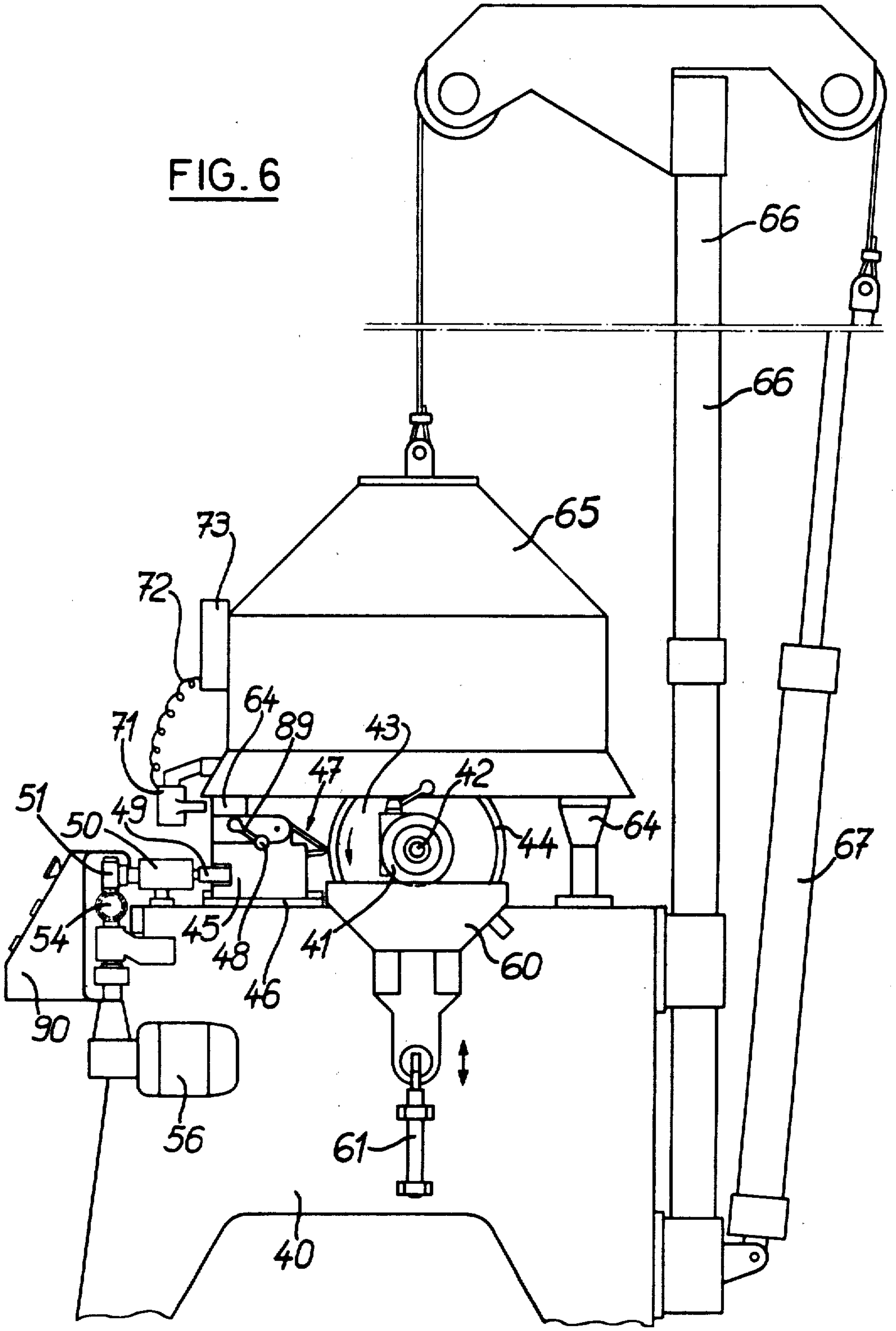
FIG. 6 is a schematic end view of apparatus for applying a coating to a wiping cylinder.
Figure 7:
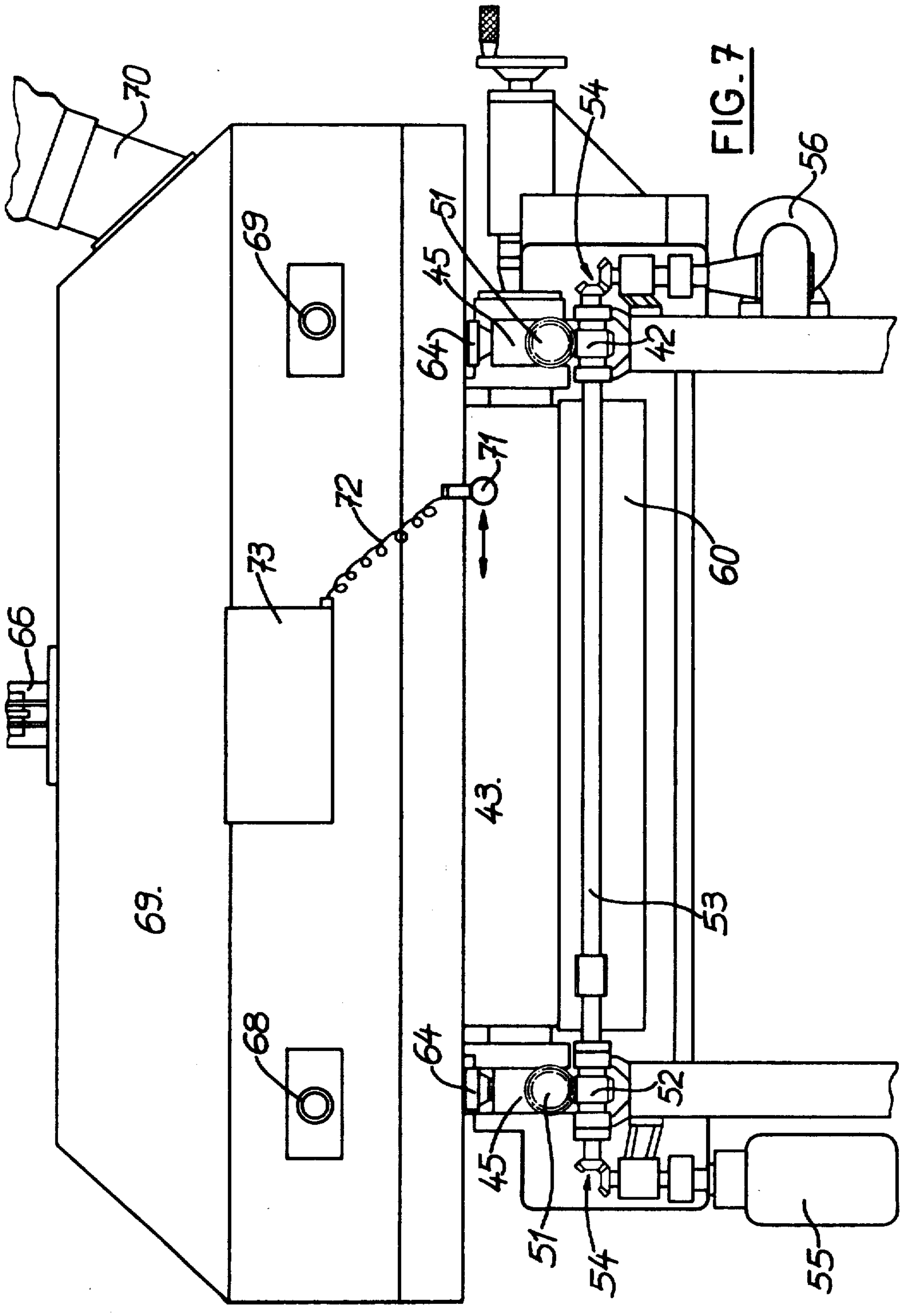
FIG. 7 is a schematic front view of the apparatus of FIG. 6.
Figure 8:
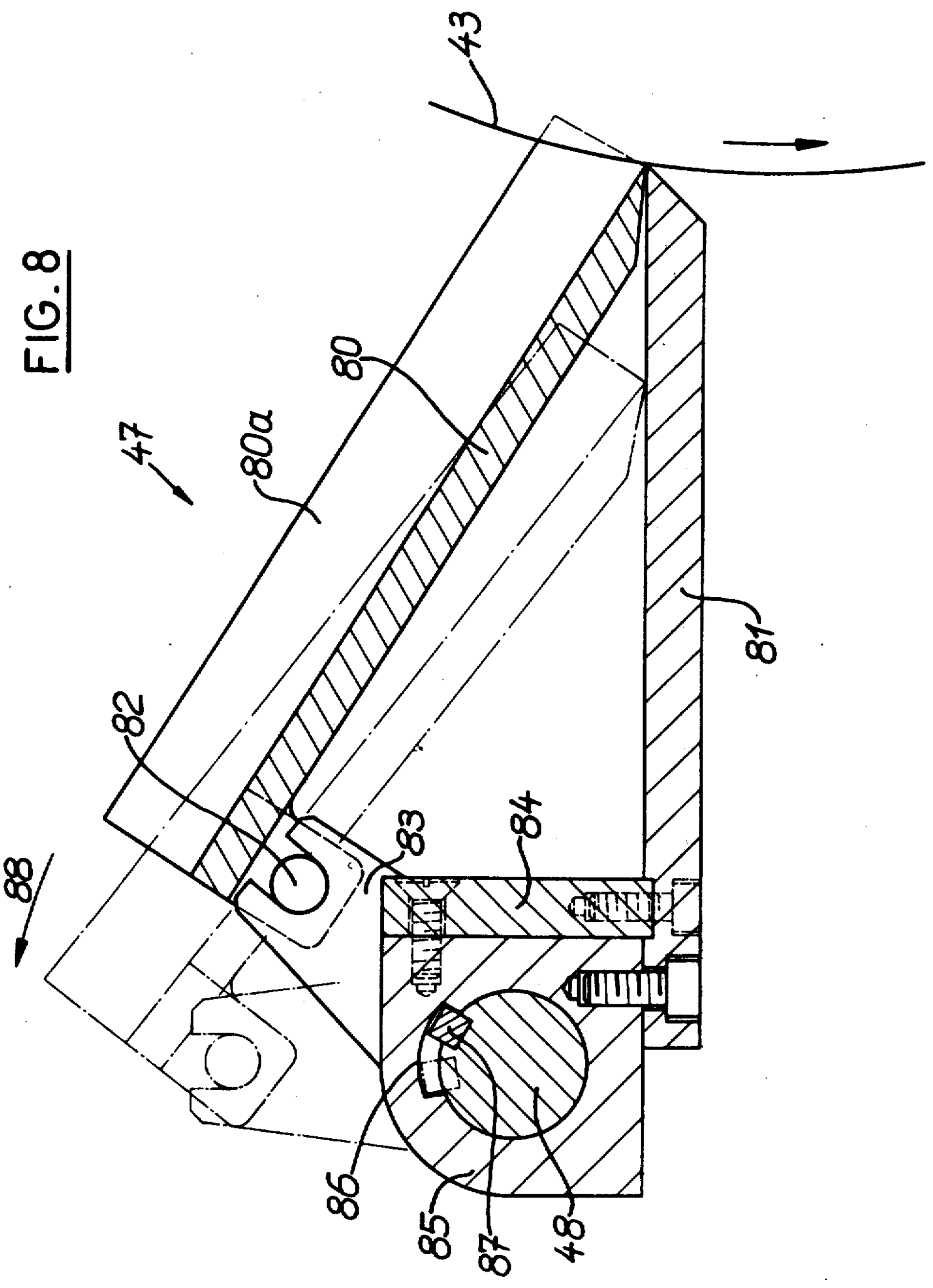
FIG. 8 is an enlarged schematic section of a coating-applying assembly of the apparatus of FIG. 6.

Modified Apparatus For Coating cylinder:

In FIGS. 6, 7 and 8 there is illustrated schematically but in somewhat more detail suitable apparatus for coating a cylinder in accordance with the present invention. The frame 40 of the apparatus has bearings 41 for receiving the ends of the shaft 42 of a cylinder 43 which is to be coated and which has been provided with a base rubber layer 44. Two supports 45 forming bearings for the ends of the shaft 48 of a plate assembly 47 (FIG. 8) are slidably mounted on the guide rails 46 that are fixed on the upper face of the frame 40 and are perpendicular to the axis of the cylinder 43 when mounted in the bearings 41. A threaded shaft 49 is screwed into an internal thread of each of the support 45 and is rotatably mounted in bearings 50 fixed on the frame 40. The outer end of each of the threaded shafts 49 carriers a worm gear 51 which engages a worm 52. The worms 52 are fixed on a common shaft 53 that is parallel to the shaft 48 and is rotatably mounted in bearings in the frame 40. Thus rotation of the shaft 53 causes the two supports 45 to move in unison toward or away from the cylinder 43 depending on the direction of rotation. One end of shaft 53 carries a bevel gear 54*a* which is driven by a first motor 55 when high speed displacement of the blade assembly is desired. The other end of the shaft 53 carries a bevel gear 54*d* which is driven by a second motor 56 through a worm gear drive for producing a low speed displacement blade assembly during the coating operation.

The worm gear drive 49, 51, 52 of the supports 45 of the blade assembly 47 forms a micrometer device (including suitable reading or indicating intruments not shown) which permits not only an accurate and readable initial adjustment of the supports 45 and hence of the blade assembly but also, by controlling the speed of the motor 56, an accurate and uniform displacement of the blade assembly away from the cylinder 43 with a well defined and constant speed during application of the plastic mass to the cylinder. The total displacement defines the total thickness of the layers applied.

The cylinder 43 is rotated slowly at a constant speed by a controlled motor (not shown). Suitable means is provided for cooling and heating the cylinder as it rotates. Thus a cooling bath 60 comprises an elongated trough which can be raised by means of pneumatic lifting cylinders 61 from a lower inactive position to a raised position as shown in FIG. 6 in which the lower portion of the cylinder 43 is immersed in water or other cooling baths contained in the trough. Suitable controls are provided for raising and lowering the bath 60 as desired.

A heating and drying dome 65 connected to a suction tube 70 is suspended above the cylinder 43 by means of a cable elevation device generally indicated by the reference numeral 66 and actuated by a pneumatic cylinder 67. In the lower heating position shown in FIGS. 6 and 7 the dome 60 receives the upper portion of the cylinder 43 and is supported by adjustable stops 64. For mounting the cylinder and during the application of the plastic mass without heating the dome 65 is raised by the elevation device 66 to its inactive upper position.

Electrical heating lamps or resistor elements are mounted inside the dome 65 by adjustable mounts which can be controlled manually by means of knobs 68 and 69 to adjust the position of the heating elements with respect to the cylinder 43 in order to obtain a substantially uniform heat distribution over the whole length of the cylinder.

Before the beginning of the coating operation, the heating elements are switched and the temperature distribution along the cylinder 43 is exactly controlled by means of a pyrometer 71 that is movable along the bottom edge of the dome 69 as indicated by the double arrow shown in FIG. 7 and is connected by a flexible line 72 to a control panel 73 for the heating elements in the dome 69. After initial adjustment of the heating elements, the pyrometer 71 remains stationary in a mid-position and functions as a sensor for the automatic heating control whereby temperature and t-me are exactly controlled according to a prescheduled program.

The blade assembly 47 (FIG. 8) comprises the above mentioned shaft 48 the ends of which are rotatably and removably mounted in the supports 45, and upper blade 80 and a lower blade 81. The upper 80 is provided at its rear side with pivots 82 that engage rotatably in fork bearings 83 rigidly secured to the shaft 48 near its ends. The forward edge of the upper blade 80 is bevelled and rests on the loer blade 81. The ends of the blade 80 are provided with upwardly projecting sidewalls 80*a* to confine plastic composition materials supplied to the upper surface of the upper blade as described below.

The lower blade 81 is screwed to a support plate 84 on which are fixed two bearing bushings 85 on the shaft 48. The inner peripheries of the bushings 85 are provided with recesses 86 having a selected angular extent. A key 87 rigidly secured to the shaft 48 is received in each of the recesses 86 of the bushings 85 with a selective clearance so as to permit predetermined angular movement between the shaft 48 and the bushings 85 supporting the lower blade 81. Downward movement of the lower blade 81 is limited by the supports 45 so as to position the blade approximately horizontally as seen in FIG. 8. The front edge of the blade 81 is bevelled downwardly and rearwardly as shown.

In the initial working position, the blade assembly 47 takes the position shown in FIG. 8. The lower blade 81 is supported in a horizontal position as shown by suitable abutments (not shown) corresponding in function to the member 14 in FIGS. 4 and 5. The lower blade 81 is exactly parallel to the cylinder 43 and has been brought into light engagement with the periphery of the cylinder. The upper blade 80 has its leading edge exactly aligned with the leading edge of the lower blade 81 on which it rests. The keys 87 on the shaft 48 are at the right hand end of the recesses 86 (FIG. 8).

After plastic material has been placed on the upper blade 80, the cylinder 43 is rotated solowly in a counter-clockwise direction as seen in FIGS. 6 and 8 and the blade assembly 47 is retracted from the surface of the cylinder by means of the motor 56 so as to spread a thin uniform layer of plastic material on the cylinder. The apparatus is thus operable to apply a succession of thin coatings to the cylinder as described above with respect to FIGS. 4 and 5. Alternatively the supports 45 are retracted continuously at constant speed by the motor 56 without changing the relative positions of the upper and lower blades so that plastic material is applied continuously to the cylinder 43 as uniform and evenly distributed "sprial" layers. After each layer is applied it is subjected to heat by the heating elements in the hood 65 and thereby partially cured. During this operation the cooling bath 60 is in its lower inactive position.

When a coating of the desired thickness has been applied, the motor 56 is stopped so that the supports 45 and hence the blade assembly remains in fixed position with respect to the rotating cylinder 53. It is thereby necessary to terminate the supply of plastic material to the cylinder without imparing the smooth perfect surface of the plastic coating either by the retracting blades or by the residual plastic mass on the upper blade 80. For this reason the shaft 48 and hence the forks 83 are rotated manually in the direction of arrow 88 by means of a handle 89 secured on one end of the shaft 48. By this rotation of the shaft 48 and the forks 83, the upper blade 80 is retracted and its leading edge (carrying the residual plastic mass) slides back on the upper face of the lower blade 81 to the broken line position as shown in FIG. 8. The lower blade 81 does not move and hence maintains the smoothness of the plastic coating on the cylinder. In this position the keys 87 of the shaft 48 abut the left hand edges of the recesses 86 in the busings 85. By further rotation of the shaft 48 in the same direction (arrow 88) the whole blade assembly 80-87 is now tilted around the axis of the shaft 48 away from the cylinder 43 since the keys 87 rotate the busings 85 and hence the lower blade 81. This manipulation of the two blades permits discontinuing the supply of plastic material to the periphery of cylinder 83 by first retracting only the upper blade while the lower blade still smoothes the surface and then retracting also the lower blade 81.

After the blade assembly has been retracted, rotation of the cylinder 43 is continued and heat is applied to the cylinder by the heating elements in the hood 65 to complete the curing of the plastic coating on the cylinder. Thus each layer of plastic is partially cured before the next layer is applied and after all of the layers making up the coating have been applied, the total coating is subjected to a further heating for final curing. If it is desired to cool the coated cylinder after the coating has been applied, the cooling bath 60 is raised to active position as shown in FIG. 6 while rotation of the cylinder is continued.

When the coating of the cylinder and the curing of the coating has been completed the hood 65 is raised and the cylinder is removed from the bearings 41.

A control panel 90 on the front of the frame 40 (not shown in FIG. 7) comprises the adjustment and control members for regulating the rotatinal speed of the cylinder 43 and the retraction or displacement speed of the blade assembly 47. The motor 55 provides means for moving the blade assembly more rapidly for example for quick course positioning of the blade assembly to accommodate the diameter of the cylinder to be coated and for moving the blade assembly back out of the way. The motor 56 as described above provides for micrometric movement of the blade assembly for fine positioning and for controlled micrometric retraction of the blade assembly during the application of a "spiral" coating.

It will be understood that the process of the invention can be carried out with plastic materials other than those given by way of example in the foregoing discussion and that modifications may be made in the process and apparatus for carrying it out without departing from the concept in the spirit of the invention.

What I claim and desire to secure by letters patent:

1. A method of making a wiping cylinder of a steel engraving press which comprises the steps of a. providing a metal base cylinder, covering said cylinder with a layer of rubber of uniform thickness, b. mounting said cylinder for rotation about its longitudinal axis with said axis horizontal, c. mounting a straight doctor blade horizontally at one side of said cylinder for micrometric movement toward and away from said cylinder, said blade extending parallel to the cylinder the full length of said cylinder, d. bringing said blade into engagement with the periphery of said covered cylinder, e. retracting said blade micrometrically while keeping it parallel to the cylinder to provide a predetermined small uniform space between said blade and cylinder, said space extending the full length of said cylinder, f. supplying heat-hardenable plastic composition to the upper side of said blade while rotating said cylinder slowly in a direction to cause its periphery to move downwardly past said blade to thereby apply to said cylinder a thin uniform layer of said composition having a thickness determined by said space between said blade and said cylinder, g. discontinuing the supply of said composition to said blade and continuing rotation of said cylinder with said blade in said position to smooth said layer without applying additional plastic composition, h. removing said blade from said cylinder, and rotating said coated cylinder while applying to said cylinder simultaneously throughout its length radiant heat to effect predetermined hardening of said layer.

2. A method according to claim 1, further comprising the step of i. discontinuing the application of said heat and applying to said coated cylinder throughout its length a cooling fluid while rotating said cylinder to reduce the temperature of said cylinder to a selected value.

3. A method according to claim 2, comprising:

j. repeating steps (d) to (i) to apply, heat harden, and cool a further thin uniform layer of heat-hardenable plastic composition.

4. A method according to claim 1, in which said blade is progressively retracted micrometrically while said cylinder is rotated to apply to said cylinder a thin spiral layer of said composition in a plurality of convolutions.

5. A method according to claim 4, in which heat is applied to said cylinder as it rotates to effect only a partial curing of each convolution of said spiral layer before a succeeding convolution is applied.

6. A method according to claim 1, in which said blade comprises a lower blade member and an upper blade member to which latter said plastic composition is supplied, and in which in removing said blade from said cylinder, said upper blade member is first retracted along the upper surface of said lower blade member while said cylinder continues to rotate and said lower blade member is then removed from said cylinder.

7. Apparatus for coating a wiping cylinder of a steel engraving press with a plastic composition comprising:

a. means for mounting a rubber covered metal base cylinder for rotation about it longitudinal axis with said axis horizontal, b. a straight blade extending the full length of said cylinder and having a straight edge presented to said cylinder, c. means mounting said blade horizontal at one side of said cylinder for movement toward and away from said cylinder while maintaining said straight edge parallel to the axis of said cylinder, d. means for moving said blade into engagement with the periphery of said rubber covered cylinder and for then micrometrically retracting said blade to provide a predetermined small uniform space between said blade and said cylinder said space extending the full length of the cylinder, e. means on the upper side of said blade for receiving a supply of heat-hardenable plastic composition and bringing said composition into engagement with the periphery of said cylinder, f. means for rotating said cylinder slowly in a direction to cause its periphery to move downwardly past said blade to thereby apply to said cylinder a thin uniform layer of said composition having a thickness determined by said space between said blade and cylinder, g. means for discontinuing the application of said composition to said cylinder while continuing to rotate said cylinder with said blade in position to smooth said layer without applying additional plastic composition, and h. means for applying radiant heat to said cylinder throughout its length, as said cylinder is rotated to effect predetermined hardening of said layer.

8. Apparatus according to claim 7, further comprising means for applying a cooling fluid to said cylinder throughout its length while said cylinder is rotated to reduce the temperature of said cylinder to a selected value.

9. Apparatus according to claim 7, in which said blade comprises a lower blade member, an upper blade member resting on said lower blade member and adapted to receive said composition and means for retracting said upper blade member to discontinue the application of said composition to said cylinder while maintaining said lower blade member in place to smooth the layer of composition already applied, and then retracting said lower blade member.

10. Apparatus according to claim 7, in which said means for moving said blade toward and away from said cylinder comprises means for micrometrically moving said blade away from the cylinder while said cylinder is rotated to apply to said cylinder a thin spiral layer of said composition in a plurality of convolutions.

11. Apparatus according to claim 7, in which said means for moving said blade toward and away from said cylinder comprises a first power driven means for moving said blade micrometrically at a selected rate and second power driven means for moving said blade more rapidly.

12. A method according to claim 1, in which said blade comprises a lower blade member which slopes downwardly away from said cylinder and an upper blade member which slopes downwardly toward said cylinder and to which said plastic composition is supplied, said upper blade member being removed from said cylinder when the supply of said composition is discontinued so as to discontinue the application of said composition to the cylinder while retaining said lower blade member in said position to smooth said layer of composition applied to the cylinder.

13. Apparatus according to claim 7, in which said blade comprises a lower blade member which slopes downwardly away from said cylinder and an upper blade member which slopes downwardly toward said cylinder and to which said plastic composition is supplied, said upper blade member being movable relative to said lower blade member for removal of said upper blade member from said cylinder when the supply of said composition is discontinued so as to discontinue the application of said composition to the cylinder, while retaining said lower blade member in said position to smooth said layer of composition applied to the cylinder.

* * * * *